April 7, 1970     M. DE LEON     3,504,650
CARGO SHIPS
Filed July 18, 1968     6 Sheets-Sheet 1
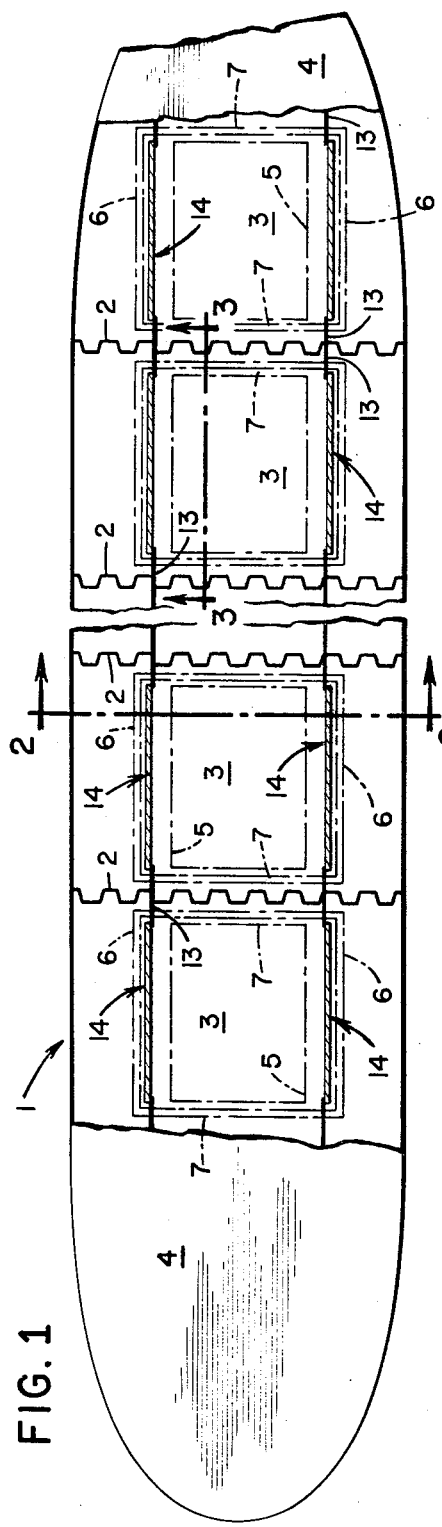
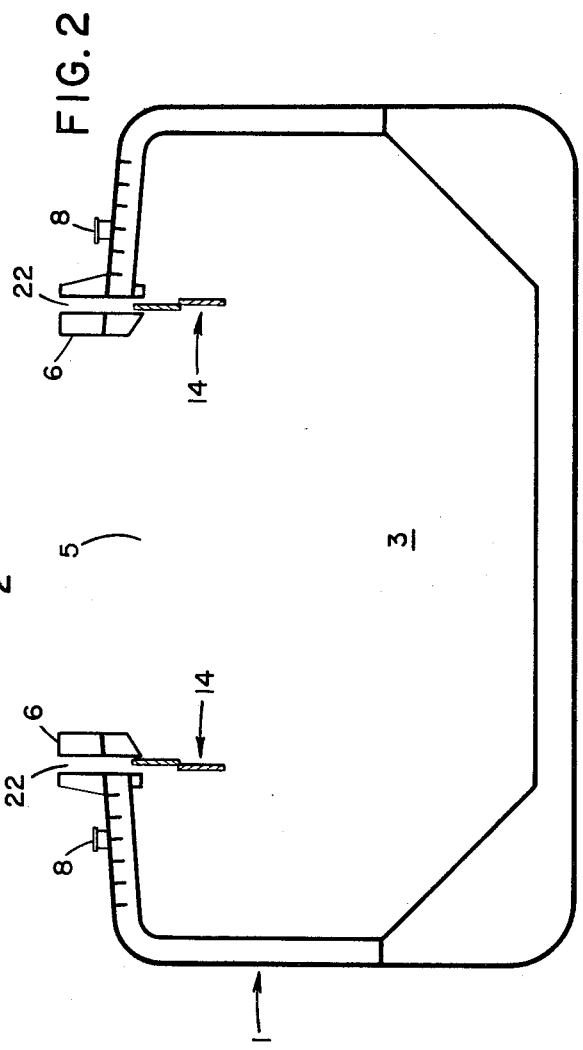
INVENTOR
MOSHE DE LEON
BY *Stevens, Davis, Miller & Mosher*
ATTORNEYS

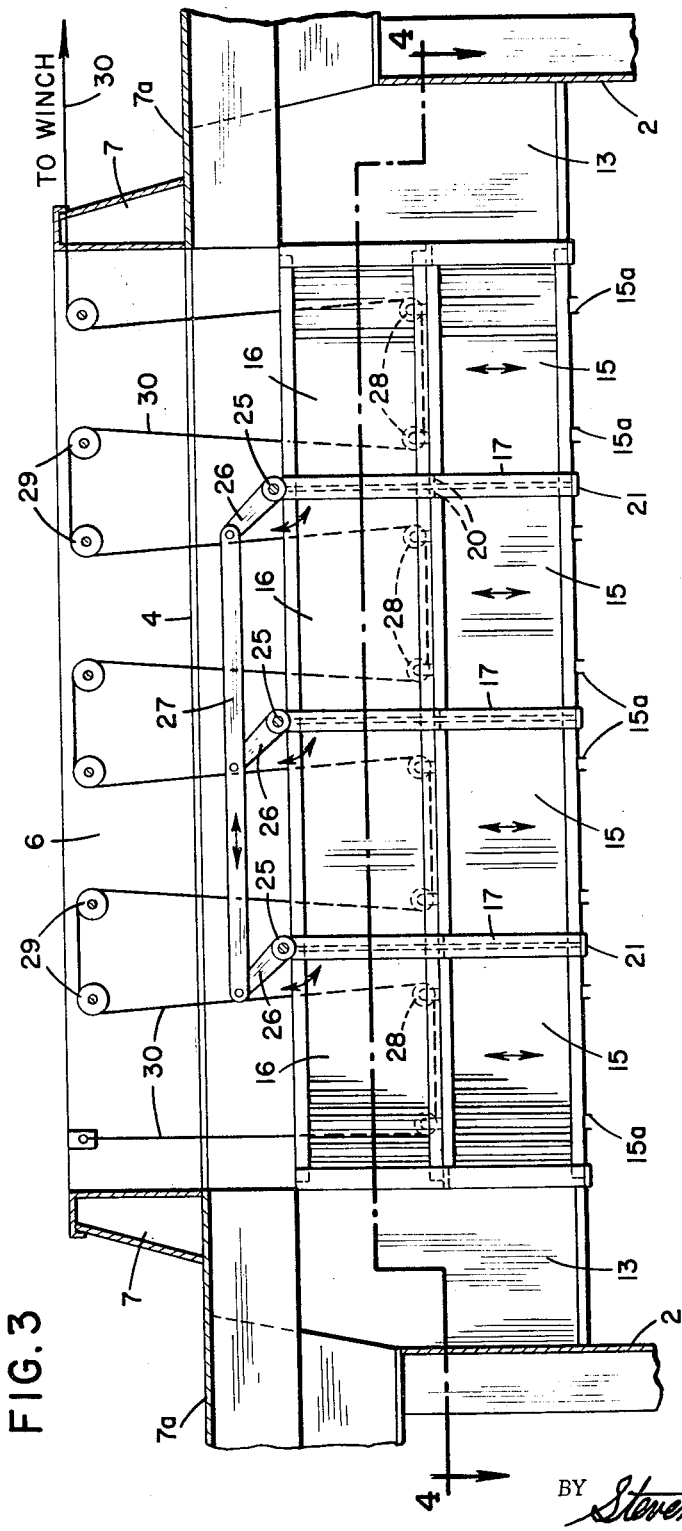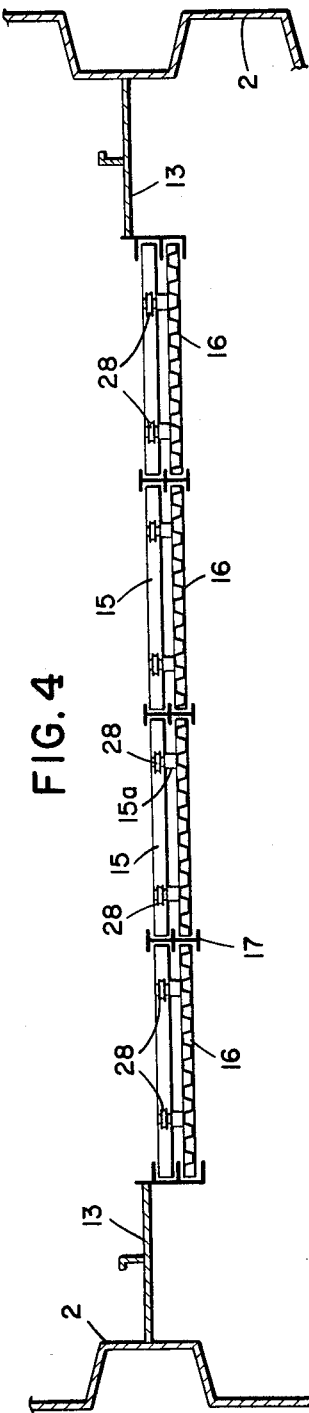

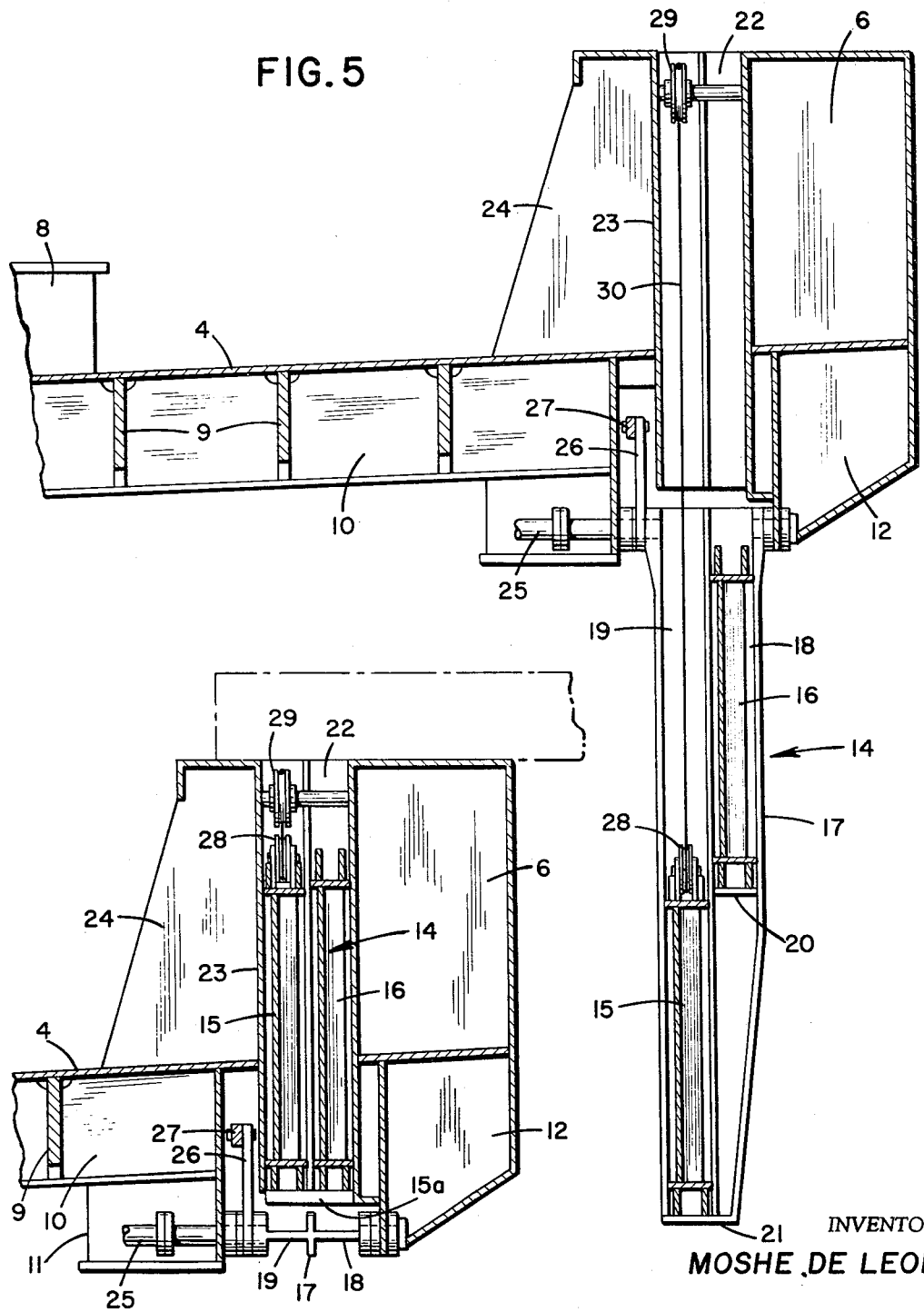

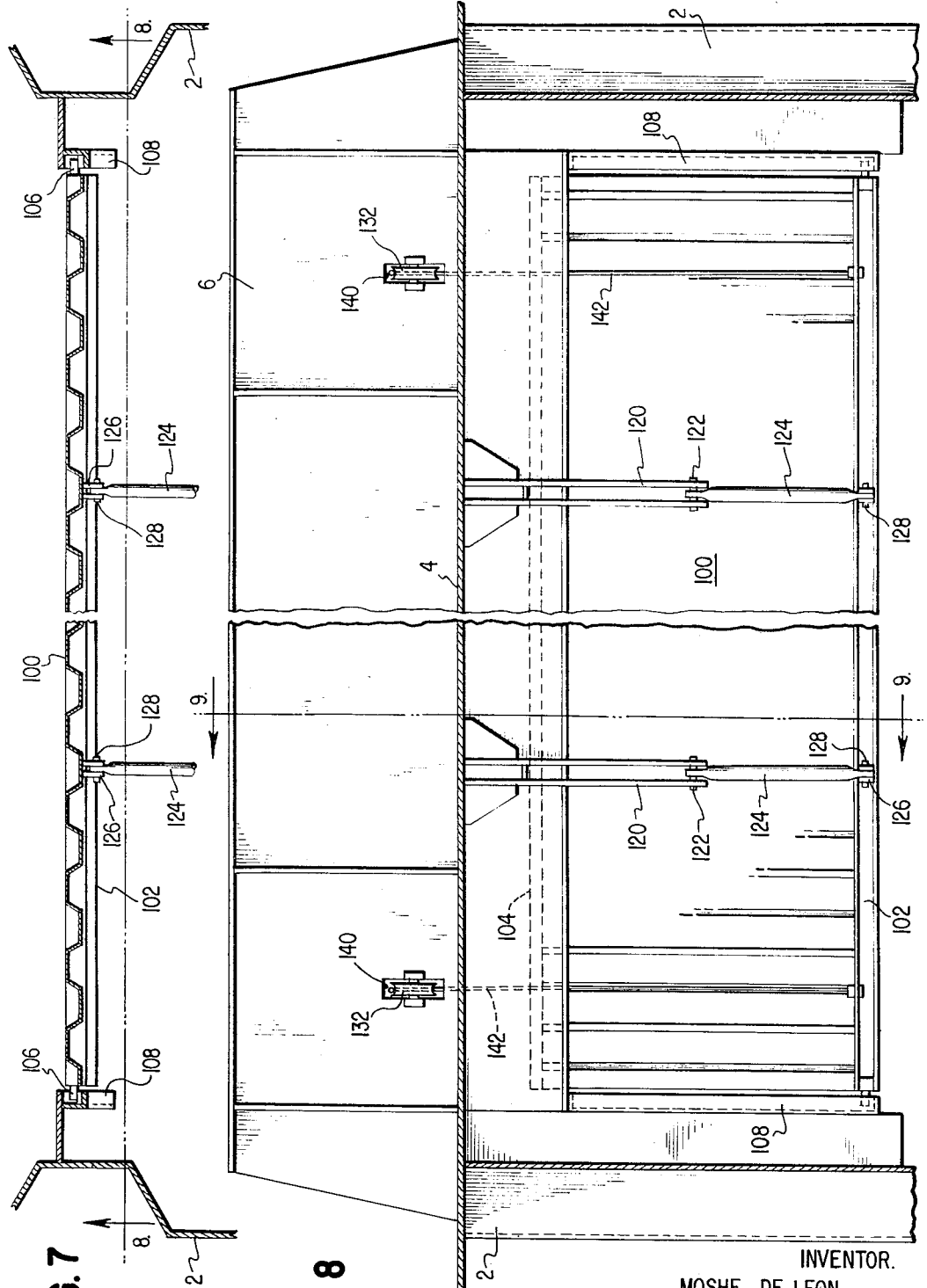

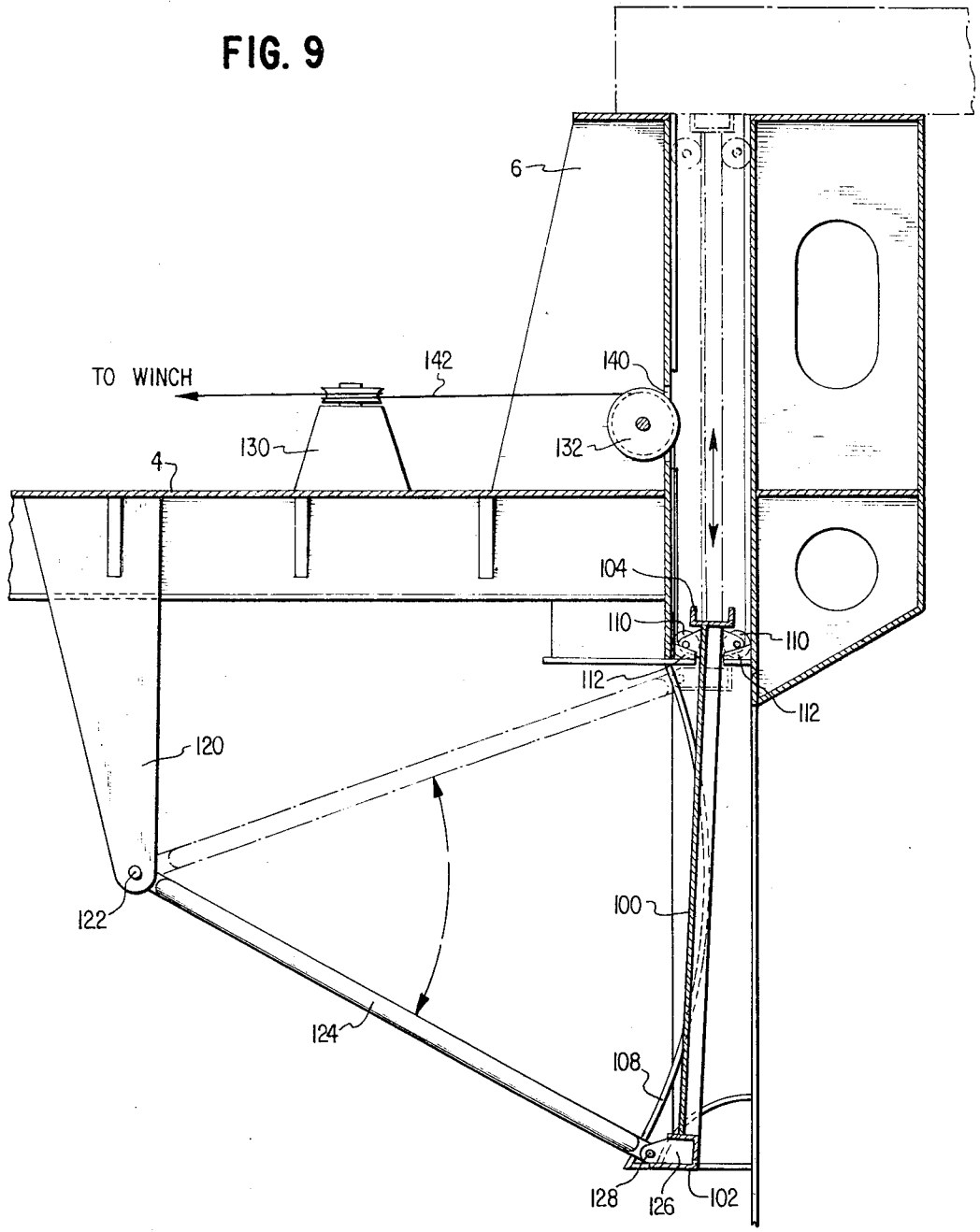

INVENTOR
MOSHE DE LEON

United States Patent Office 3,504,650
Patented Apr. 7, 1970

3,504,650
CARGO SHIPS
Moshe de Leon, New York, N.Y., assignor to John J. McMullen Associates, Inc., New York, N.Y., a corporation of New York
Filed July 18, 1968, Ser. No. 745,818
Claims priority, application Israel, Aug. 10, 1967, 28,486
Int. Cl. B63b 25/24
U.S. Cl. 114—75        9 Claims

ABSTRACT OF THE DISCLOSURE

A cargo ship for carrying bulk cargoes of various natures characterized by a shifting board arrangement to enable the transportation of grain and the like in the most efficacious manner. Shifting boards are arranged along opposite sides of cargo holds and adapted to be lowered into position to prevent shifting of the cargo and retracted into a storage enclosure to permit filling the cargo holds to a greater capacity when carrying other bulk materials, such as ores.

---

The present invention relates to cargo ships and in particular to bulk dry cargo ships of the kind designed to transport grain or other comminuted, readily flowable cargo, but which can also be used, if required, for other forms of bulk dry cargo.

When grain is loaded on board ship, it tends to settle at an angle of repose which is, on the average, about 30° with respect to the horizontal. Furthermore, after loading and during transport, the grain tends to settle, and, in consequence, its overall bulk volume after settling is about 2% less than that directly after loading. In consequence, despite the fact that the ship may have been loaded with grain right to the hatch level, empty spaces remain between the upper surfaces of the cargo and the deck, and further empty spaces may develop when the grain settles during transport. The presence of such empty spaces may be of dangerous consequence in stormy weather as the cargo shifts to one side of the vessel giving it a heeling moment as a consequence of which the deck line of the vessel may be immersed with the dangers or ultimate capsize.

In order to minimize the amount of empty space remaining in the hold after loading, it is known to provide the upper hold corners, under the deck, with corner plating which slopes in correspondence with the estimated angle of repose of the cargo and which effectively defines underdeck tanks. The provision of such underdeck tanks, however, increases the cost of construction of the ship and results in a loss of cargo capacity when the ship is used for carrying cargo other than grain or the like.

In non-specialized vessels, i.e., those which are not designed to carry only one specific type of cargo and which can carry occasional grain cargoes, as an alternative to the relatively expensive provision of underdeck tanks, it is usual to divide the hold by means of partitions (known as shifting boards) located fore and aft. These partitions can be constituted by a single bulkhead located along the ship's longitudinal axis and extending for the full length of all the cargo holds. Alternatively, the partitions can be constituted by two bulkheads located symmetrically about the ship's longitudinal axis and spaced from each other by a distance not greater than 60% of the breadth of the ship.

These hitherto proposed partions have either been permanently fixed in the holds or are designed to be assembled and disassembled as required.

Whilst the provision of such partitions is much cheaper than the provision of the underdeck tanks and does not result in the loss of storage capacity, it has been found in practice that, for vessels specializing in the transportation of bulk cargo, their presence seriously interferes with the capacity of the ship for loading with non-comminuted bulk dry cargoes, such as coal, bauxite ore, or the like. Thus, when the ship is to carry such dry cargoes and in order to avoid the partitions interfering with the cargo space or becoming damaged by the cargo, it is necessary to remove the partitions every time that there is a change of cargo from grain or the like to the non-flowable cargo and, on the other hand, to reerect the partitions every time it is desired to use the ship for transporting grain or the like. It has been found in practice that the time and effort involved in removing and reerecting the partitions is so great as to render their use impracticable. On the other hand, where the ship is provided with permanent fixed partitions, their presence seriously detracts from the efficiency of the ship in the storage and transport of non-flowable bulk dry cargoes.

It is an object of the present invention to provide a cargo ship with means whereby the above-referred-to hazards and drawbacks are effectively and economically overcome.

According to the present invention, there is provided a cargo ship having displaceable shifting boards located fore and aft and substantially aligned with port and starboard hatch edges, a storage enclosure wholly removed from the cargo space, and displacing means for lowering the shifting boards from said enclosure into position within the cargo space so as to constitute fore and aft bulkheads and for retracting the shifting boards from the cargo space into said enclosure.

Preferably, said enclosures are arranged to be situated alongside the hatch coamings.

In accordance with a preferred embodiment of the present invention, each hold is provided with an assembly of shifting board panels mounted to be retracted into an enclosure with the lower ends of the panels being guided by a pivotally mounted arm. In a further embodiment, the assembly of shifting board panels are arranged such that each panel is comprised of a pair of members mounted and displaceable in a double hung window sash manner.

A cargo ship provided with displaceable shifting boards in accordance with the present invention can be readily used for grain or similar readily flowable cargoes, in which case the shifting boards are displaced into their lowered positions or for non-readily flowable cargoes, such as coal or the like. In the latter case, the shifting boards are retracted into the storage enclosure prior to loading and are not liable to be damaged by the cargo, and a maximum cargo storage space is available in the holds.

One embodiment of a cargo ship fitted with displaceable shifting boards in accordance with the present invention will now be described by way of example and with reference to the accompanying drawings in which:

FIG. 1 is a plan view (partially below deck) of a cargo ship in accordance with the present invention;

FIG. 2 is a cross-sectional view of the cargo ship shown in FIG. 1 taken along the line II—II;

FIG. 3 is a longitudinal sectional view of the cargo ship shown in FIG. 1 taken along the line III—III;

FIG. 4 is a sectional plan view of the shifting boards shown in FIG. 3 taken along line IV—IV of a cargo ship as shown in FIG. 1 seen below deck level;

FIG. 5 is a view on an enlarged scale of a detail shown in FIG. 2 with the shifting boards lowered;

FIG. 6 is a view of the detail shown in FIG. 5 with the shifting boards retracted into a storage enclosure;

FIG. 7 is a view similar to FIG. 4 but illustrating an alternative embodiment of the shifting board;

FIG. 8 is a sectional elevation view taken along line VIII—VIII of FIG. 7;

FIG. 9 is a sectional elevation view taken along line IX—IX of FIG. 8;

Figure 10:
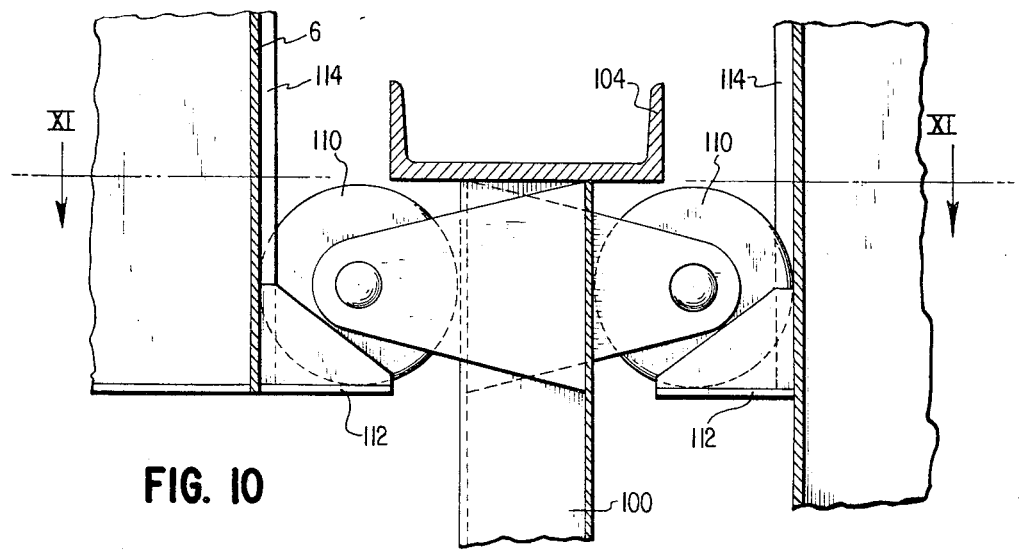
FIG. 10 is an enlarged detail of the roller guides.
Figure 11:
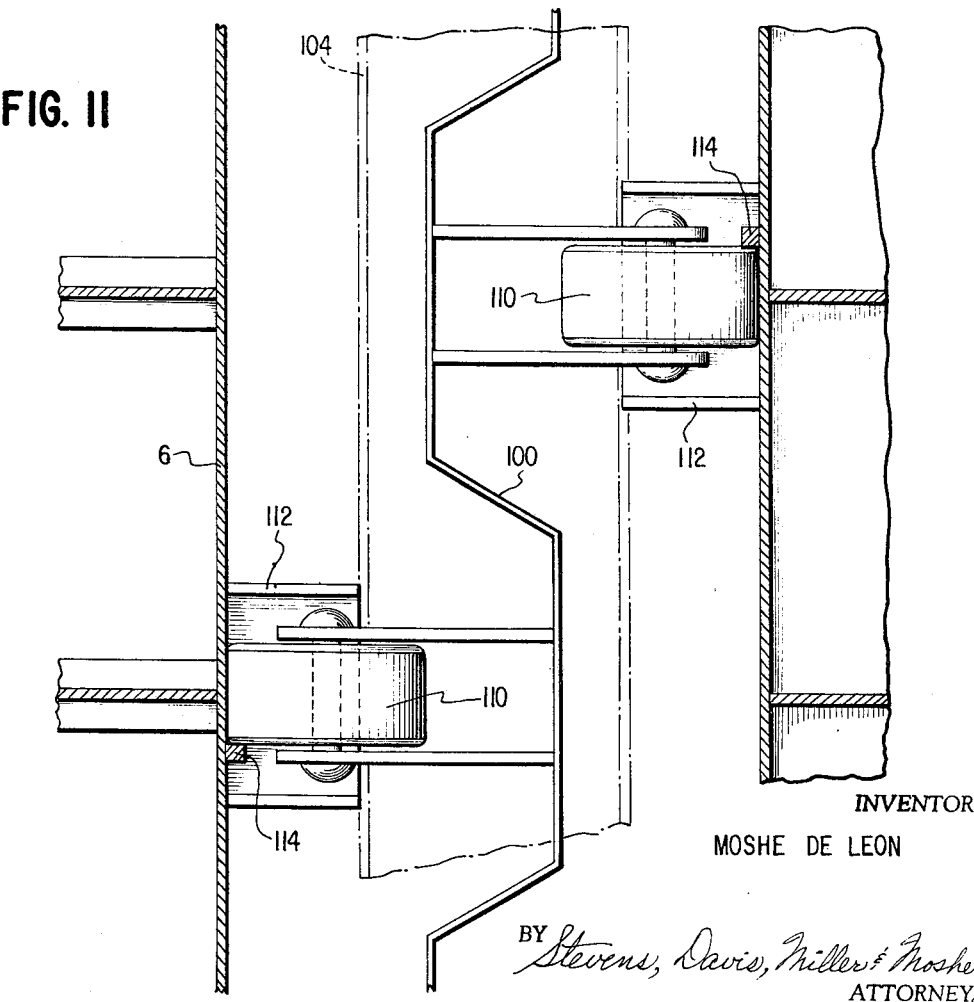
FIG. 11 is a sectional plan view taken along line XI—XI of FIG. 10.

As seen in FIG. 1 of the drawings, a cargo ship 1 is divided by a plurality of transverse bulkheads 2 extending athwartship into a number of cargo holds 3 covered by a common deck 4, each hold 3 having its own hatchway 5. Each hatchway 5 is defined by a pair of (port and starboard) hatch coamings 6 and a pair of transverse coamings 7, each pair of transverse coamings 7 being separated by a deck plate 7a. Auxiliary loading openings 8 are provided on the decks 4 on either side of the hatch coamings 6, three pairs of loading openings 8 being provided for each hold 3.

As can be seen in FIG. 5 of the drawings, the deck 4 is supported by longitudinal girders 9 which are, in their turn, supported by transverse girders 10. The outboard ends of these transverse girders 10 are secured to the side of the ship's side plating whilst the inboard ends of the transverse girders 10 are secured to strong fore and aft girders 11. The hatch coamings 6 are supported by strong fore and aft girders 12.

As can be seen in FIGS. 3 and 4 of the drawings, aligned with the outboard edges of each hatch coaming 6 is a longitudinal assembly of alternatingly fixed and displaceable shifting boards 13 and 14. The fixed shifting boards 13 are respectively located below the deck plates 7a whilst the displaceable shifting boards 14 are located between opposite deck plates 7a. The fixed shifting boards 13 are constituted by steel panels which are firmly secured by welding or the like to the corresponding transverse bulkheads 2. The displaceable shifting boards 14, on the other hand, are constituted by successive pairs of vertically slidable steel panels 15, 16, each pair 15, 16 being of the double hung window sash kind, the constituent panels 15 and 16 of which are vertically slidable in parallel adjoining vertical planes. Secured to the lowermost edge of the panels 15 are projecting lugs 15a. Each pair of panels 15, 16 are supported and guided between a pair of displaceable steel columns 17, which columns, as clearly seen in FIGS. 4 and 5 of the drawings, are of double-H cross-sectional shape defining front and rear pairs of tracks 18 and 19.

At an intermediate position of each column, projecting from and secured to its track 18, is a lug 20 defining the lower limit of travel of the panel 16 whilst a lug 21 projects from and is secured to the lower end of the track 19 defining the lower limit of travel of the panel 15.

A storage enclosure 22 is defined between the outboard edge of each hatch coaming 6 and vertical steel plates 23 outboardly spaced from the hatch coamings 6, the upper end of the vertical steel plates 23 being outboardly flanged and being buttressed at spaced intervals by spaced-apart brackets 24.

Journalled in the girders 11 and 12 directly below the storage enclosure 22 and spaced apart fore and aft are pivotal axles 25 on which are pivotally mounted the steel columns 17, thus permitting these columns 17 to swing in a fore and aft direction but insuring their complete rigidity in an athwartship direction. As seen in FIG. 6 of the drawings, when the shifting boards 14 are retracted, the columns 17 are swung upwardly so as to lie fore and aft and so as to be disposed between the girders 11 and 12. When, however, the shifting boards 14 are to be lowered into the hold 3, the columns 17 are first lowered (as seen in FIG. 5 of the drawings), so as to extend normally down into the hold 3 in which position they are restrained from movement in an athwartship direction.

As seen in FIGS. 3, 5, and 6 of the drawings, the axles 25 are respectively secured (for example, by welding) to inclined arms 26, which are pivotally secured together by a tie rod 27. One of the pivotal axles 25 of one of the columns 17 is coupled to a power drive (not shown), the arrangement being such that when power is transmitted from the power drive to that axle 25, a turning moment is transmitted via the tie rod 27 to all the columns 17, and, depending on the sense of the drive, the columns are rotated either into a stored position in the storage enclosure 22, as shown in FIG. 6 of the drawings, or into a lowered position, as shown in FIG. 5 of the drawings. The power drive can be powered either from an electric motor or from a suitable hydraulic installation and can be actuated by controls located near the respective hatch coamings 6.

The means for raising and lowering the displaceable shifting boards 14 will now be described.

As seen in FIG. 3 of the drawings, pairs of pulleys 28 are respectively mounted on the upper ends of the panels 15. Further pairs of pulleys 29 are respectively mounted in the upper end of the storage enclosure 22 directly above the columns 17. A cable 30 passes around all the pulley pairs 28 and 29, one end of the cable 30 being coupled to a fixed point 31, whilst the other end of the cable passes over a final pulley 29 and is coupled to a drum (not shown) operated by a winch (not shown).

When it is desired to lower the shifting boards 14 into position in the holds, the columns 17 are first of all swung downwardly into position into the holds by a power drive being applied to one of the pivotal axles 25. The winch then unwinds the cable 30 from the drum and the panel pairs 15, 16 descend, the panels 16 descending whilst being on the lugs 15a of the panels 15. The descent of the panels 16 continues until they abut the supporting lugs 20 of the columns 17, whereupon the panels 15 continue to descend along until they are located in their final position supported by the base lugs 21 of the columns 17.

When it is desired to withdraw the shifting boards 14 from the holds 3, the winch winds the cable 30 on the drum, raising the panels 15, and, when the lugs 15a thereof contact the lower edges of the panels 16, the latter are also raised until the panel pairs 15, 16 are located in the storage enclosure 22 where suitable means (not shown) are provided for retaining the panels. The columns 17 are then pivoted upwardly into the enclosure 22.

When the ship is to be used for the loading and transport of grain or similar comminuted dry cargo, the displaceable shifting boards 14, constituted by the panels 15, 16 and columns 17 described above, are lowered into the holds in the manner described above, in which position they are rigidly secured against any athwartship movement, the holds are then loaded with the cargo through the hatchways 5. When no more cargo can be loaded in this manner, the holds 3 are closed by hatch covers, and the portions of the holds 3 outboard of the shifting boards 14 are topped up with cargo via the auxiliary loading openings 8. In this way, the holds 3 are loaded to their maximum capacity, whilst the presence of the lowered shifting boards 14 substantially reduces the dangers inherent in movement of the cargo as a result of empty cargo space which may arise for reasons indicated above.

When, on the other hand, the ship is to be used for loading and transport of non-comminuted cargo, such as, for example, coal or the like, the displaceable shifting boards 14 are entirely withdrawn from the holds 3 into the storage enclosures 22 in the manner indicated above, whereupon the holds 3 can be fully loaded with no danger of damage to the shifting boards and with no reduction in the effective cargo space.

Referring to FIGS. 7–11, inclusive, the preferred embodiment of the invention will now be described. In the description of these figures, like reference numerals have been applied to like parts wherever possible. As will be evident from these figures, the shifting board, in place of being divided into two parts and arranged like a double hung window, consists of one unitary body extending between the transverse bulkheads 2. The shifting board has been designated in these figures by the reference numeral 100 and consists of a corrugated sheet of iron, steel or the like. A C-shaped channel 102 is welded to the bottom edge of the shifting board 100 as is evident from FIGS. 8 and 9, and a U-shaped channel 104 has its web welded to the top edge of the board 100 as best shown in FIGS. 9 and 10. A pin 106 is welded to the lower corner at each side of the board and is received and rides in a guide designated by the reference numeral 108. The guide defines an arcuate path and serves to guide the lower end of the shifting board while it is being lowered and retracted. The upper end of the shifting board is provided with rollers 110 mounted on opposite sides thereof to bear against the inner surface of the recess defined in the hatch coaming 6. These rollers 110 are journalled in brackets welded to opposite faces of the shifting board and are freely rotatable to bear against the opposite surfaces of the recess. The lower end of the recess is provided with flanges 112 which serve as a bottom stop for the rollers 110. Rods 114 are fixed to the opposite faces of the recess to serve as further guiding means for the rollers 110.

Spaced outboard from the shifting board, pairs of brackets 120 are welded to the bottom of the deck 4 and carry at their lower ends, by means of pivot pins 122, one end of arms 124. The other ends of arms 124 are pivotally connected, by means of pivot pins 128, with bracket plates 126 welded into the C-shaped channel 102.

The raising and lowering of the shifting board 100 is accomplished through a capstan and pulley system. The capstan 130 is mounted on the deck 4, and the cable 142 therefrom leads over a pulley 132 down to the lower end of the shifting board where it is attached to the channel 102. The cable 142 passes through an opening 140 defined in the hatch coaming 6. Although any number may be employed, three such capstan and pulley arrangements are deemed to be sufficient to effect the raising and lowering of the shifting board. Two of the pulleys 132 are depicted in FIG. 8. The cables 142 lead to any conventional take-up mechanism which thereby controls the raising and lower of the shifting board in a known manner.

If the shifting board is in the position as shown in FIG. 9, that is, lowered, and it is desired to raise the shifting board to its retracted position as shown in phantom in FIG. 9, the take-up mechanism is operated to take up cables 142. This produces the required vertical force at the lower end of the shifting boards, and, as it is raised, rollers 110 guide the upper end into the recesses defined by the hatch coaming 6. The lower end of the shifting board is guided by pins about the arcuate surface 108 which describes an arc having a radius of curvature equal to the length of the arm 124 between the pivots 122 and 128. Lowering of the shifting board is accomplished by paying out the cables 142.

What is claimed is:

1. A cargo ship having displaceable shifting boards, capable of maintaining stowed and lowered positions, located fore and aft and substantially aligned with port and starboard hatch edges, a vertically oriented storage enclosure wholly removed from the cargo space and located substantially above the lowered position of said shifting boards, displacing means for lowering the shifting boards from said enclosure into position within the cargo space so as to constitute fore and aft bulkheads and for retracting the shifting boards from the cargo space into said enclosure.

2. A cargo ship according to claim 1, wherein the shifting boards of each hold are arranged as an assembly of consecutive pairs of shifting board panels, the panels of each pair being mounted and displaceable in a double hung window sash manner with respect to displaceable guide columns.

3. A cargo ship according to claim 2, wherein said columns are pivotally displaceable from a stored position in a fore and aft direction to a lowered position in the holds; whilst said panels are displaceable in a double hung window sash manner in their own planes.

4. A cargo ship according to claim 3, wherein said columns are mounted at one set of ends thereof to pivotal axles which are coupled together, means being provided for imparting a turning drive to said axles.

5. A cargo ship according to claim 3, wherein said panels are coupled via a draw cable to means for raising or lowering them.

6. A cargo ship according to claim 1, wherein the shifting board is guided at the upper end within the storage enclosure and at its lower end by a pivotally mounted rod.

7. A cargo ship according to claim 6, wherein the guiding of the upper end is accomplished by means of rollers mounted on opposite sides of the shifting board.

8. A cargo ship according to claim 6, wherein the shifting board is a corrugated member having channel members attached to the upper and lower edges.

9. A cargo ship according to claim 6, wherein the lower end of the shifting board is guided by means of an arm pivotally mounted at one end to the lower end of the shifting board and pivotally mounted at its other end to a fixed structure, and guide means are provided for the lower end of the shifting board to guide same through an arc having a radius of curvature equal to the length of the pivotally mounted arm.

References Cited

FOREIGN PATENTS 177,371 11/1961 Sweden.
797,230 6/1958 Great Britain.

TRYGVE M. BLIX, Primary Examiner